(12) United States Patent
Kim et al.

(10) Patent No.: US 9,799,875 B2
(45) Date of Patent: *Oct. 24, 2017

(54) ELECTRODE ASSEMBLY AND RECHARGEABLE BATTERY HAVING ELECTRODE TAB

(71) Applicant: Samsung SDI Co., Ltd., Yongin-si, Gyeonggi-do (KR)

(72) Inventors: Yu-Na Kim, Yongin-si (KR); Jang-Ho Yoon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 45 days.

This patent is subject to a terminal disclaimer.

(21) Appl. No.: 14/969,810

(22) Filed: Dec. 15, 2015

(65) Prior Publication Data

US 2016/0218344 A1 Jul. 28, 2016

(30) Foreign Application Priority Data

Jan. 28, 2015 (KR) .................. 10-2015-0013815

(51) Int. Cl.
*H01M 2/26* (2006.01)
*H01M 10/04* (2006.01)

(52) U.S. Cl.
CPC ........ *H01M 2/263* (2013.01); *H01M 10/0431* (2013.01); *H01M 2220/20* (2013.01)

(58) Field of Classification Search
CPC ............. H01M 2/263; H01M 10/0409; H01M 10/0431; H01M 10/0587; H01M 4/70; H01M 10/052; H01M 10/0413
See application file for complete search history.

(56) References Cited

U.S. PATENT DOCUMENTS 2,187,466 A 1/1940 Stratford
6,746,796 B2 * 6/2004 Watanabe ............ H01M 2/263
29/623.1

(Continued)

FOREIGN PATENT DOCUMENTS

EP 1 207 565 A2 5/2002
JP 2011-171079 A 9/2011

OTHER PUBLICATIONS

Extended European Search Report (EESR) dated Oct. 7, 2016 for European Patent Application No. EP 16 150 338.8 which shares priority of Korean Patent Application No. KR 10-2015-0013814 with U.S. Appl. No. 14/969,803, which is related to Subject U.S. Appl. No. 14/969,810. The EESR cites references previously disclosed in the subject application.

(Continued)

*Primary Examiner* — Stewart Fraser
(74) *Attorney, Agent, or Firm* — Knobbe Martens Olson & Bear LLP (57) ABSTRACT

An electrode assembly and a rechargeable battery including the electrode assembly are disclosed. In one aspect, the electrode assembly includes a first electrode and a second electrode that are wound with a separator placed therebetween. The second electrode includes a first coated portion coated with an active material and a plurality of first electrode tabs T1-Tn protruding outwardly from the first coated portion, wherein n is a natural number greater than 2. The first electrode, when spread in a plane form, includes first to nth portions on which the first electrode tabs T1-Tn are respectively formed, wherein the first and nth portions of the first electrode respectively define the innermost and outermost portions thereof. The distance between the first electrode tab Tn placed at the outermost portion and the first electrode Tn−1 placed at the second outermost portion of the (Continued)

first electrode is less than any of the distances between two adjacent ones of the other first electrode tabs T1-Tn−1.

18 Claims, 6 Drawing Sheets

(56) References Cited

U.S. PATENT DOCUMENTS

| | | | | |
|---|---|---|---|---|
| 8,702,818 | B2* | 4/2014 | Sohn | H01M 2/22 29/623.1 |
| 9,012,053 | B2* | 4/2015 | Chun | H01M 2/023 429/122 |
| 2009/0239133 | A1 | 9/2009 | Kosugi | |
| 2016/0218343 | A1* | 7/2016 | Kim | H01M 10/0409 |
| 2016/0218345 | A1* | 7/2016 | Kim | H01M 2/263 |

OTHER PUBLICATIONS

Partial European Search Report dated May 18, 2016 for European Patent Application No. EP 16 150 338.8 which shares priority of Korean Patent Application No. KR 10-2015-0013814, filed Jan. 28, 2015, with U.S. Appl. No. 14/969,803, which is related to subject U.S. Appl. No. 14/969,810.

* cited by examiner

ELECTRODE ASSEMBLY AND RECHARGEABLE BATTERY HAVING ELECTRODE TAB

CROSS-REFERENCE TO RELATED APPLICATION

This application claims priority to and the benefit of Korean Patent Application No. 10-2015-0013815 filed in the Korean Intellectual Property Office on Jan. 28, 2015, the entire contents of which are incorporated herein by reference.

This application relates to U.S. Patent Applications entitled "ELECTRODE ASSEMBLY AND RECHARGEABLE BATTERY HAVING ELECTRODE TAB" (application Ser. No. 14/969,803) and "ELECTRODE ASSEMBLY AND RECHARGEABLE BATTERY HAVING ELECTRODE TAB" (application Ser. No. 14/969,823), which are concurrently filed on the same date as this application and incorporated herein by reference in their entirety.

BACKGROUND

Field

The described technology generally relates to an electrode assembly and a secondary battery.

Description of the Related Technology

A rechargeable (or secondary) battery can be charged and discharged multiple times, unlike a primary battery. A low-capacity rechargeable battery is used for small portable electronic devices, such as a portable phone, a smartphone, a tablet computer, a notebook computer, and a camcorder, and a high-capacity rechargeable battery (most often used with an array of batteries or battery cells) is widely used as a power source for driving a motor for a hybrid vehicle or an electric vehicle.

Recently, a high-output rechargeable battery using a non-aqueous electrolyte solution with high energy density has been developed. The high-output rechargeable battery is configured as a high-capacity rechargeable battery in which a plurality of rechargeable batteries are connected in series so as to be used in driving a device requiring high power, for example, a motor for an electric vehicle.

In addition, one high-capacity rechargeable battery is generally composed of a plurality of rechargeable batteries which are connected in series, and the rechargeable battery may have a cylindrical or angular shape. In addition, the rechargeable battery has an electrode assembly implementing charging and discharging, and the electrode assembly includes a positive electrode, a negative electrode, and a separator interposed between the positive and negative electrodes. The electrode assembly is often formed with a structure in which a plurality of positive electrode plates and negative electrode plates are stacked or a structure in which band-shaped positive and negative electrodes are wound.

SUMMARY OF CERTAIN INVENTIVE ASPECTS

One inventive aspect relates to an electrode assembly and a secondary battery having an electrode tab.

Another aspect is an electrode assembly capable of being easily wound, and a rechargeable battery including the same.

Another aspect is an electrode assembly in which a first electrode and a second electrode are wound with a separator placed therebetween, wherein the positive electrode includes a first coated portion coated with an active material and a plurality of first electrode tabs not coated with an active material and protruding outward of the first coated portion, and wherein the distance between the first electrode tab $Tn$ placed at the outermost side and the first electrode $Tn-1$ placed second from the outside in the electrode assembly is smaller than the distances between the other first electrode tabs, on the basis of when the first electrode is spread in a plane form.

The distances between electrode tabs of from the first electrode tab $T1$ placed at the innermost side to the first electrode tab $Tn-1$ placed second from the outside in the electrode assembly may be the same.

The distance between the first electrode tab $Tn$ placed at the outermost side and the first electrode tab $Tn-1$ placed second from the outside in the electrode assembly may be 0.2 to 0.7 times the distances between the other first electrode tabs.

When the first electrode is unwound, the first electrode tabs of from the first electrode $T1$ placed at the innermost side to the first electrode tab $Tn-1$ placed second from the outside in the electrode assembly may face the first electrode tab $Tn$ placed at the outermost side across an imaginary plane passing a center of the electrode assembly.

The second electrode may include a second coated portion coated with an active material and a plurality of second electrode tabs not coated with an active material and protruding outward of the second coated portion, and the distance between the second electrode tab $Yn$ placed at the outermost side and the second electrode $Yn-1$ placed second from the outside in the electrode assembly may be smaller than the distances between the other second electrode tabs, on the basis of when the second electrode is spread in a plane form.

The distances between the second electrode tabs of from the second electrode tab $Y1$ placed at the innermost side to the second electrode tab $Yn-1$ placed second from the outside in the electrode assembly may be the same.

When the second electrode is unwound, the second electrode tabs of from the second electrode $Y1$ placed at the innermost side to the second electrode tab $Yn-1$ placed second from the outside in the electrode assembly may face the second electrode tab $Tn$ placed at the outermost side across an imaginary plane passing a center of the electrode assembly.

Another aspect is a rechargeable battery, including: an electrode assembly in which a first electrode and a second electrode are wound with a separator placed therebetween; a case containing the electrode assembly; and a cam plate combined with the case, wherein the first electrode includes a first coated portion coated with an active material and a plurality of first electrode tabs $T1$-$Tn$ not coated with an active material and protruding outward of the first coated portion, and wherein the distance between the first electrode tab $Tn$ placed at the outermost side and the first electrode $Tn-1$ placed second from the outside in the electrode assembly is smaller than the distances between the other first electrode tabs, on the basis of when the first electrode is spread in a plane form.

The distances between the second electrode tabs of from the first electrode tab $T1$ placed at the innermost side to the first electrode tab $Tn-1$ placed second from the outside in the electrode assembly may be the same.

The distance between the first electrode tab $Tn$ placed at the outermost side and the first electrode tab $Tn-1$ placed second from the outside in the electrode assembly may be 0.2 to 0.7 times the distances between the other first electrode tabs.

When the first electrode is unwound, the first electrode tabs of from the first electrode tab T1 placed at the innermost side to the first electrode tab Tn−1 placed second from the outside in the electrode assembly may face the first electrode tab Tn placed at the outermost side across an imaginary plane passing a center of the electrode assembly.

The second electrode may include a second coated portion coated with an active material and a plurality of second electrode tabs not coated with an active material and protruding outward of the second coated portion, and the distance between the second electrode tab Yn placed at the outermost side and the second electrode tab Yn−1 placed second from the outside in the electrode assembly may be smaller than the distances between the other second electrode tabs, on the basis of when the second electrode is spread in a plane form.

The distances between the second electrode tabs of from the second electrode tab Y1 placed at the innermost side to the second electrode tab Yn−1 placed second from the outside in the electrode assembly may be the same.

When the second electrode is unwound, the second electrode tabs of from the second electrode Y1 placed at the innermost side to the second electrode tab Yn−1 placed second from the outside in the electrode assembly may face the second electrode tab Tn placed at the outermost side across an imaginary plane passing a center of the electrode assembly.

A first terminal electrically connected to the first electrode is installed on the cap plate, a connection terminal formed in a pillar shape being fitted into the first terminal, and the first terminal may be electrically connected to the first electrode via a first current collecting member, the first current collecting member including an upper plate bonded to the connection terminal and an electrode attachment portion bent from the upper plate toward the electrode assembly to be bonded to the first electrode tabs.

Another aspect is an electrode assembly for a rechargeable battery, comprising: a first electrode and a second electrode that are wound with a separator placed therebetween, wherein the first electrode includes a first coated portion coated with an active material and a plurality of first electrode tabs T1-Tn protruding outwardly from the first coated portion, wherein n is a natural number greater than 2, wherein the first electrode, when spread in a plane form, includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn−1 placed at the second outermost portion of the first electrode is less than any of the distances between two adjacent ones of the first electrode tabs T1-Tn−1.

In the above electrode assembly, the distances between two adjacent ones of the first electrode tabs T1-Tn−1 are the same. In the above electrode assembly, the distance between the first electrode tabs Tn and Tn−1 is about 0.2 times to about 0.7 times each of the distances between two adjacent ones of the first electrode tabs T1-Tn−1. In the above electrode assembly, when the first electrode is unwound, the first electrode tabs T1-Tn−1 face the first electrode tab Tn across an imaginary plane passing a center of the electrode assembly.

In the above electrode assembly, the second electrode includes a second coated portion coated with an active material and a plurality of second electrode tabs protruding outwardly from the second coated portion, and wherein the second electrode, when spread in a plane form, includes first to nth portions on which the second electrode tabs Y1-Yn are respectively formed, wherein the first and nth portions of the second electrode respectively define innermost and outermost portions thereof, wherein the distance between the second electrode tab Yn placed at the outermost portion and the second electrode Yn−1 placed at the second outermost portion of the second electrode is less than any of the distances between two adjacent ones of the second electrode tabs Y1-Yn−1. In the above electrode assembly, the distances between two adjacent ones of the second electrode tabs Y1-Yn−1 are the same. In the above electrode assembly, when the second electrode is unwound, the second electrode tabs Y1-Yn−1 face the second electrode tab Yn across an imaginary plane passing a center of the electrode assembly.

Another aspect is a rechargeable battery, comprising: an electrode assembly in which a first electrode and a second electrode are wound with a separator placed therebetween; a case containing the electrode assembly; and a cap plate connected to the case, wherein the first electrode includes a first coated portion coated with an active material and a plurality of first electrode tabs T1-Tn protruding outward of the first coated portion, wherein n is a natural number greater than 2, wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode Tn−1 placed at the second outermost portion of the first electrode is less than any of the distances between two adjacent ones of the other first electrode tabs T1-Tn−1.

In the above battery, the distances between two adjacent ones of the first electrode tabs T1-Tn−1 are the same. In the above battery, the distance between the first electrode tabs Tn and Tn−1 is about 0.2 times to about 0.7 times each of the distances between two adjacent ones of the first electrode tabs T1-Tn−1. In the above battery, when the first electrode is unwound, the first electrode tabs T1-Tn−1 face the first electrode tab Tn across an imaginary plane passing a center of the electrode assembly. In the above battery, the second electrode includes a second coated portion coated with an active material and a plurality of second electrode tabs protruding outwardly from the second coated portion, and wherein the second electrode, when spread in a plane form, includes first to nth portions on which the second electrode tabs Y1-Yn are respectively formed, wherein the first and nth portions of the second electrode respectively define innermost and outermost portions thereof, wherein the distance between the second electrode tab Yn placed at the outermost portion and the second electrode Yn−1 placed at the second outermost portion of the second electrode is less than any of the distances between two adjacent ones of the second electrode tabs Y1-Yn−1.

In the above battery, the distances between two adjacent ones of the second electrode tabs Y1-Yn−1 are the same. In the above battery, while the second electrode is unwound, the second electrode tabs Y1-Yn−1 face the second electrode tab Tn across an imaginary plane passing a center of the electrode assembly. The above battery further comprises a first terminal electrically connected to the first electrode and formed on the cap plate, and a connection terminal formed in a pillar shape being fitted into the first terminal, and wherein the first terminal is electrically connected to the first electrode via a first current collecting member, the first current collecting member including an upper plate bonded to the connection terminal and an electrode attachment portion bent from the upper plate toward the electrode assembly to be bonded to the first electrode tabs. In the above battery, the rechargeable battery is configured to power a motor to start a vehicle.

Another aspect is an electrode assembly for a rechargeable battery, comprising: a first electrode and a second electrode; a separator placed between the first and second electrodes, a plurality of first electrode tabs T1-Tn protruding outwardly from the first electrode, wherein n is a natural number greater than 2, wherein the first electrode includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn−1 placed at the second outermost portion of the first electrode is less than any of the distances between two adjacent ones of the first electrode tabs T1-Tn−1.

In the above electrode assembly, the distances between two adjacent ones of the first electrode tabs T1-Tn−1 are the same. In the above electrode assembly, the distance between the first electrode tabs Tn and Tn−1 is about 0.2 times to about 0.7 times each of the distances between two adjacent ones of the first electrode tabs T1-Tn−1. In the above electrode assembly, the first electrode tabs T1-Tn−1 face the first electrode tab Tn across an imaginary plane passing a center of the electrode assembly.

According to at least one of the disclosed embodiments, the point at which the winding of the electrode assembly is ended can be easily detected using the electrode tab placed at the outermost side of the electrode assembly.

DETAILED DESCRIPTION OF CERTAIN INVENTIVE EMBODIMENTS

Generally, in a secondary battery, it is important to align protruding electrode tabs when a positive electrode, a negative electrode, and a separator are stacked and wound, and to this end, a winding end point and a winding start point need to be accurately checked.

Embodiments will be described more fully hereinafter with reference to the accompanying drawings, in which exemplary embodiments of the invention are shown. However, the present invention may be embodied in many different forms, and is not limited to the exemplary embodiments described herein. In addition, like reference numerals refer to like elements throughout the specification and drawings. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 1:
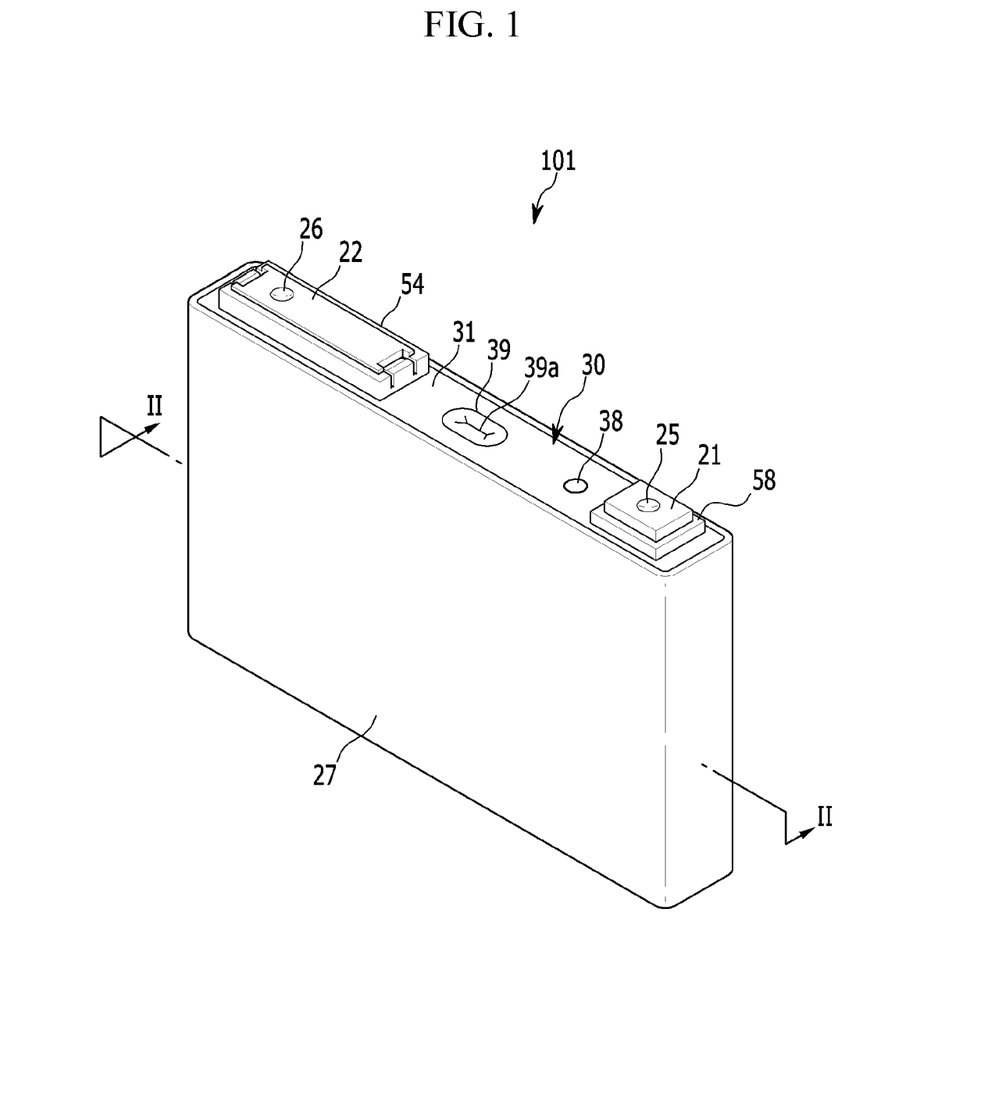
FIG. 1 is a perspective view showing a rechargeable battery according to an embodiment.
Figure 2:
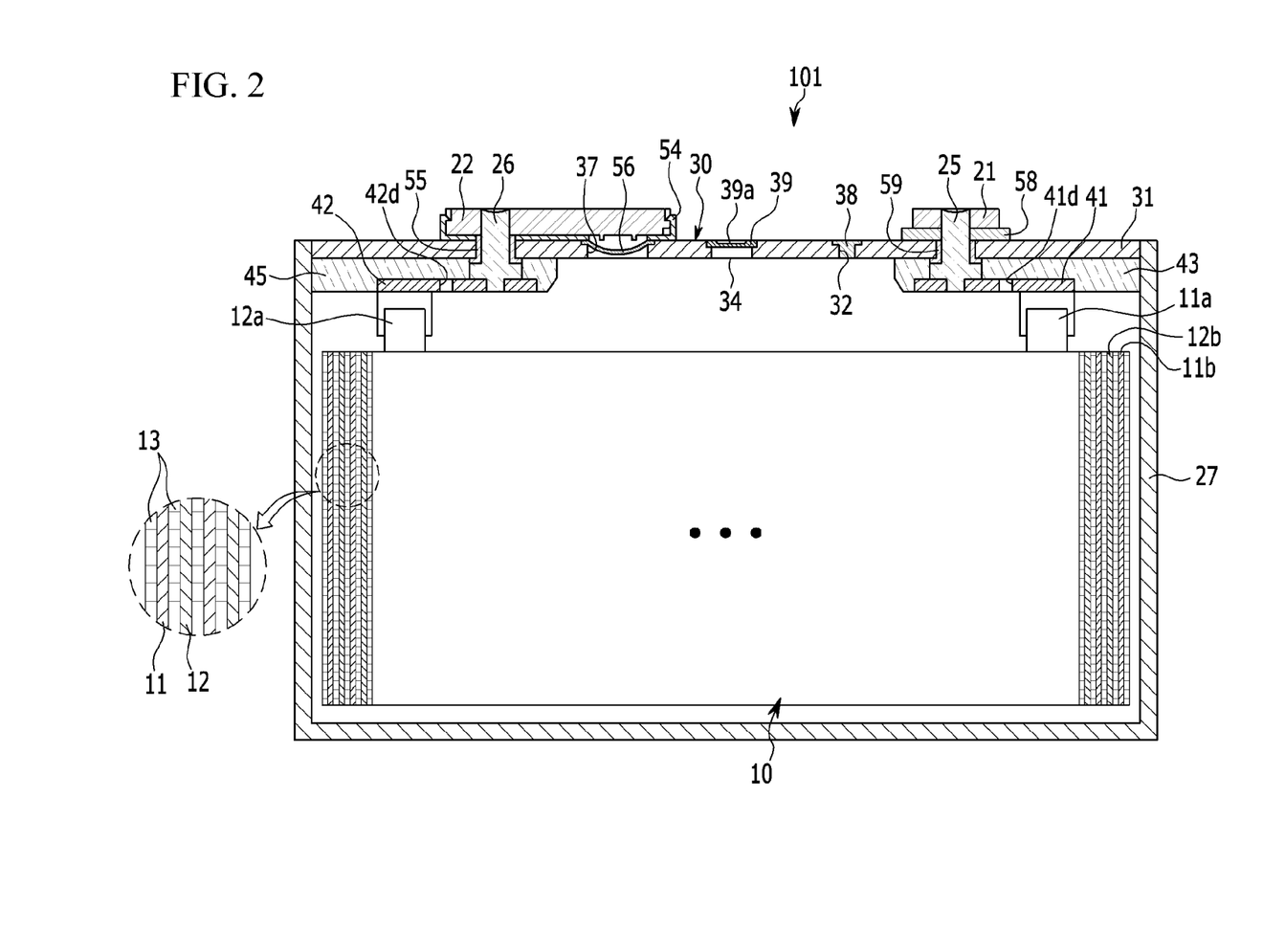
FIG. 2 is a cross-sectional view taken along line II-II in FIG. 1.

FIG. 1 is a perspective view showing a rechargeable battery 101 according to an embodiment, and FIG. 2 is a cross-sectional view taken along line II-II in FIG. 2.

Referring to FIGS. 1 and 2, the rechargeable battery 101 includes an electrode assembly 10 in which a positive electrode (first electrode) 11 and a negative electrode (second electrode) 12 are wound with a separator 13 interposed therebetween, a case 27 containing the electrode assembly 10, and a cap assembly 30 coupled to an opening of the case 27.

The rechargeable battery 101 will be described by exemplifying a lithium ion rechargeable battery with an angular shape. However, the present invention is not limited thereto, and may be applied to various types of batteries, such as a lithium polymer battery or a cylindrical shaped battery. In addition, the rechargeable battery 101 according to the present embodiment is a high-output rectangular shaped battery, and may be formed as, particularly, a battery for powering a motor to start a vehicle. Since such a battery requires momentary high power, a structure in which electrode tabs protrude upward is favorable, as in the present embodiment. However, it is very difficult to accurately align electrode tabs in cases of the structure in which the electrode tabs protrude upward. In order to accurately align the electrode tabs, a point at which winding is started and a point at which the winding is ended need to be accurately specified, and thus the electrode tabs can be accurately stacked without missing each other.

The case 27 can have a substantially cuboid shape, and an opening is formed in one surface thereof. The case 27 may be formed of a metal, such as aluminum or stainless steel.

The cap assembly 30 includes a cap plate 31 covering the opening of the case 27, a first terminal 21 protruding out of the cap plate 31 and electrically connected to the positive electrode 11, and a second terminal 22 protruding outwardly from the cap plate 31 and electrically connected to the negative electrode 12.

The cap plate 31 can have a long plate shape that is lengthened in one direction, and is coupled to the opening of the case 27. The cap plate 31 is equipped with a sealing stopper 38, which is installed at an electrolyte inlet 32, and a vent plate 34, which is installed at a vent hole 39 and has a notch 39a which can be opened at a predetermined pressure. The first terminal 21 and the second terminal 22 are installed on the cap plate 31.

The first terminal 21 is electrically connected to the positive electrode 11 via a first current collecting member 41, and the second terminal 22 is electrically connected to the negative electrode 12 via a second current collecting member 42. However, the present invention is not limited thereto, and the first terminal 21 may be electrically connected to the negative electrode and the second terminal 22 may be electrically connected to the positive electrode.

The first terminal 21 can have a rectangular plate shape. The first terminal 21 is electrically connected to the positive electrode 11 via a connection terminal 25 bonded to the first current collecting member 41. The connection terminal 25 can have a pillar shape, and can be attached to the first terminal 21 by welding while an upper end of the connection terminal 25 is fitted into the first terminal 21. In addition, the upper end of the connection terminal 25 can be attached to the first current collecting member 41 by welding, and the first current collecting member 41 electrically connects the connection terminal 25 and the positive electrode 11.

A sealing gasket 59 is inserted into a hole, through which the terminal passes, between the first terminal 21 and the cap plate 31, and a lower insulation member 43 supporting the first current collecting member 41 is formed below the cap plate 31.

A connection member 58 electrically connecting the first terminal 21 and the cap plate 31 is formed below the first terminal 21. Hence, the cap plate 31 and the case 27 are positively charged.

The second terminal 22 can have a rectangular plate shape. The second terminal 22 is electrically connected to the negative electrode 12 via a connection terminal 26 bonded to the second current collecting member 42. An upper end of the connection terminal 26 is attached to the second terminal 22 while passing through the first cap plate 31 and the second terminal 22.

The connection terminal 26 can have a pillar shape, and is attached to the second terminal 22 while an upper end of the connection terminal 26 is fitted into the second terminal 22. In addition, the upper end of the connection terminal 26 can be attached to the second current collecting member 42 by welding, and the second current collecting member 42 electrically connects the connection terminal 26 and the negative electrode 12.

A sealing gasket 55 is inserted into a hole, through which the connection terminal 26 passes, between the second terminal 22 and the cap plate 31, and a lower insulation member 45 for insulating the second current collecting member 42 and the second terminal 22 from each other by the cap plate 31 is formed below the cap plate 31.

A short circuit protrusion protruding toward a short circuit hole 37 is formed on a lower portion of the second terminal 22. The second terminal 22 is extended in one direction to cover the short circuit hole 37. An upper insulation member 54 electrically insulating the second terminal 22 and the cap plate 31 is formed between the second terminal 22 and the cap plate 31.

The cap assembly 30 includes the short circuit member 56 for short circuiting the positive electrode 11 and the negative electrode 12, the short circuit member 56 is electrically connected to the cap plate 31, and is transformed to be connected to the second terminal 22 when the inner pressure of the rechargeable battery 101 rises.

The cap plate 31 has the short circuit hole 37, and the short circuit member 56 is placed between the upper insulation member 54 and the cap plate 31 in the short circuit hole 37. In addition, the second terminal 22 is placed in the short circuit hole 37 to cover the short circuit hole 37. The short circuit member 56 includes a curved portion which is bent in an arc shape to be convex downward, and an edge portion formed outside the curved portion and fixed to the cap plate 31.

When a gas is generated due to an abnormal reaction inside the secondary rechargeable battery, the inner pressure of the secondary rechargeable battery rises. When the inner pressure of the secondary rechargeable battery is higher than the predetermined pressure, the curved portion is transformed to be convex upward, and here, the short circuit protrusion and the short circuit member 56 are touched to cause a short circuit.

Figure 3:
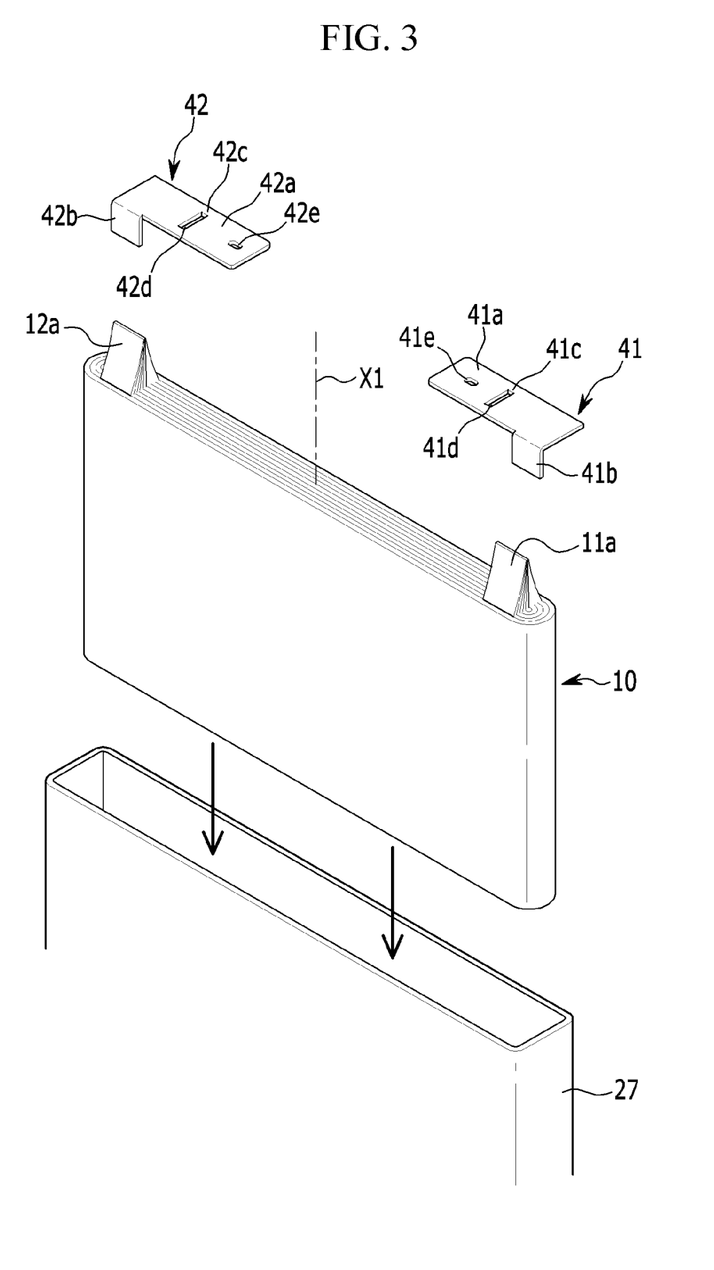
FIG. 3 is an exploded perspective view showing a part of a rechargeable battery according to an embodiment.

FIG. 3 is an exploded perspective view showing a part of a rechargeable battery according to an embodiment of the present invention.

Referring to FIGS. 2 and 3, the electrode assembly 10 includes a positive electrode 11, a negative electrode 12, and a separator 13 placed between the positive and negative electrodes 11 and 12, which have a band shape, and has a wound structure. The electrode assembly 10 is wound around a winding axis (x1) while the separator 13 is interposed between the positive and negative electrodes 11 and the 12, and then pressed to be flattened. The electrode assembly 10 includes one positive electrode 11, one negative electrode 12, and two separators 13.

The positive electrode 11 includes a positive electrode current collector, and a positive electrode active material layer coated on the positive electrode current collector. The positive electrode current collector may be formed of a metal thin plate of aluminum or the like, and the positive electrode active material layer may be formed of a lithium-based oxide. The negative electrode 12 includes a negative electrode current collector, and a negative electrode active material layer coated on the negative electrode current collector. The negative electrode current collector may be formed of a metal thin plate of copper or the like, and the negative electrode active material layer may be formed of a carbon-based active material. The separator 13 can be formed as a porous thin film, and may be formed of a polyolefin based resin.

A first non-coated portion 11a and a second non-coated portion 12a are formed on the electrode assembly 10 to protrude toward the cap plate. The first non-coated portion 11a and the second non-coated portion 12a are spaced apart from each other in a width direction of the electrode assembly 10.

The first current collecting member 41 includes an upper plate 41a bonded to the connection terminal 25, and an electrode attachment portion 41b bent toward the electrode assembly 10 and bonded to the first non-coated portion 11a. The electrode attachment portion 41b is bent from an end in a width direction of the upper plate 41a to be parallel with the electrode assembly 10.

The upper plate 41a can have a quadrangular plate shape, and can be attached to a lower portion of the connection terminal 25 by welding. The upper plate 41a has a coupling hole 41e, and the connection terminal 25 and the upper plate 41a are welded together while a protrusion formed on a lower portion of the connection terminal 25 is fitted into the coupling hole 41e.

The upper plate 41a includes a fuse 41c having a smaller cross-sectional area compared with the periphery. A fuse hole 41d is formed in the fuse 41c, and thus the fuse 41c has a smaller vertical cross-sectional area compared with the periphery. The fuse hole 41d is formed in the center of the fuse 41c, and the fuse 41c is formed on both sides of the fuse hole 41d.

The second current collecting member 42 includes an upper plate 42a bonded to the connection terminal 26, and an electrode attachment portion 42b bent toward the electrode assembly 10 and bonded to the second non-coated portion 12a. The electrode attachment portion 42b is bent from an end in a width direction of the upper plate 42a to be parallel with the electrode assembly 10.

The upper plate 42a can have a quadrangular plate shape, and can be attached to a lower portion of the connection terminal 26 by welding. The upper plate 42a has a coupling hole 42e, and the connection terminal 26 and the upper plate 42a can be welded together while a protrusion formed on a lower portion of the connection terminal 26 is fitted in the coupling hole 42e.

The upper plate 42a includes a fuse 42c having a smaller cross-sectional area compared with the periphery. A fuse hole 42d is formed in the fuse 42c, and thus the fuse 42c has a smaller vertical cross-sectional area compared with the periphery. The fuse hole 42d is formed in the center of the fuse 42c, and the fuse 42c is formed on both sides of the fuse hole 42d.

The positive electrode 11 includes a first coated portion 11b coated with a positive electrode active material layer, and a first non-coated portion 11a without a positive electrode active material layer. The first non-coated portion 11a includes first electrode tabs that are stacked. In addition, the negative electrode 12 includes a second coated portion 12b coated with a negative electrode active material layer, and a second non-coated portion 12a without a negative electrode active material layer. The second non-coated portion 12a includes second electrode tabs that are stacked.

Figure 4:
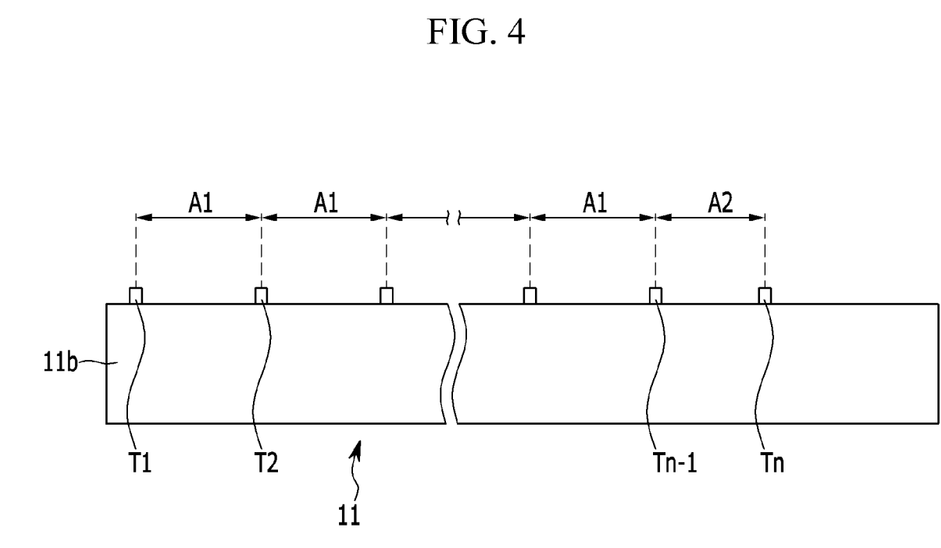
FIG. 4 is a developed plane view of a positive electrode according to an embodiment.

FIG. 4 is a developed plane view of a positive electrode 11 according to an embodiment.

Referring to FIG. 4, the positive electrode 11 includes a plurality of first electrode tabs T1-Tn that protrude upwardly from the first coated portion 11b. As shown in FIG. 4, the first electrode tab T1 is placed at the innermost portion of the positive electrode 11 and the first electrode tab T2 is placed at the second innermost portion of the positive electrode 11. Similarly, the first electrode tab Tn is placed at the outermost portion of the positive electrode 11, and the first electrode tab Tn−1 is placed at the second outermost portion of the positive electrode 11.

The first electrode tabs T1-Tn are spaced apart from each other in a length direction of the positive electrode 11, and the distances A1 between two adjacent ones of the electrode tabs T1-Tn can be the same.

In the present disclosure, the distances between the first electrode tabs T1-Tn refer to spaced distances in a length direction of the positive electrode 11 on the basis of when the positive electrode 11 is spread in a plane form. In addition, the distance between the first electrode tabs T1-Tn means a distance between centers of neighboring first electrode tabs T1-Tn.

The distance A2 between the first electrode tab Tn and the first electrode tab Tn−1 can be less than the distance A1 between two adjacent ones of the other first electrode tabs T1-Tn−1 when the positive electrode 11 is spread in a plane form.

The distance A2 can be about 0.2 times to about 0.7 times the distance A1. However, depending on the embodiments, the distance A2 can be less than about 0.2 times or greater than 0.7 times the distance A1, as long as A2 is less than A1.

Hence, a winding apparatus easily differentiates the first electrode Tn placed at the outermost side in one electrode assembly and the first electrode tab T1 placed at the first in another electrode assembly, thereby detecting a winding end point and a winding start point more accurately.

That is, the winding apparatus may measure the distances between the first electrode tabs T1-Tn using a photo-sensor or the like. If the distance between electrode tabs is determined to be different, the winding apparatus may determine the sensed first electrode tab Tn as being a tab placed at the outermost side and thus specify the position at which the winding is to be ended. Therefore, the winding of one electrode assembly 10 can be accurately and promptly ended, and the winding of another electrode assembly 10 can be started at the accurate position.

Figure 6:
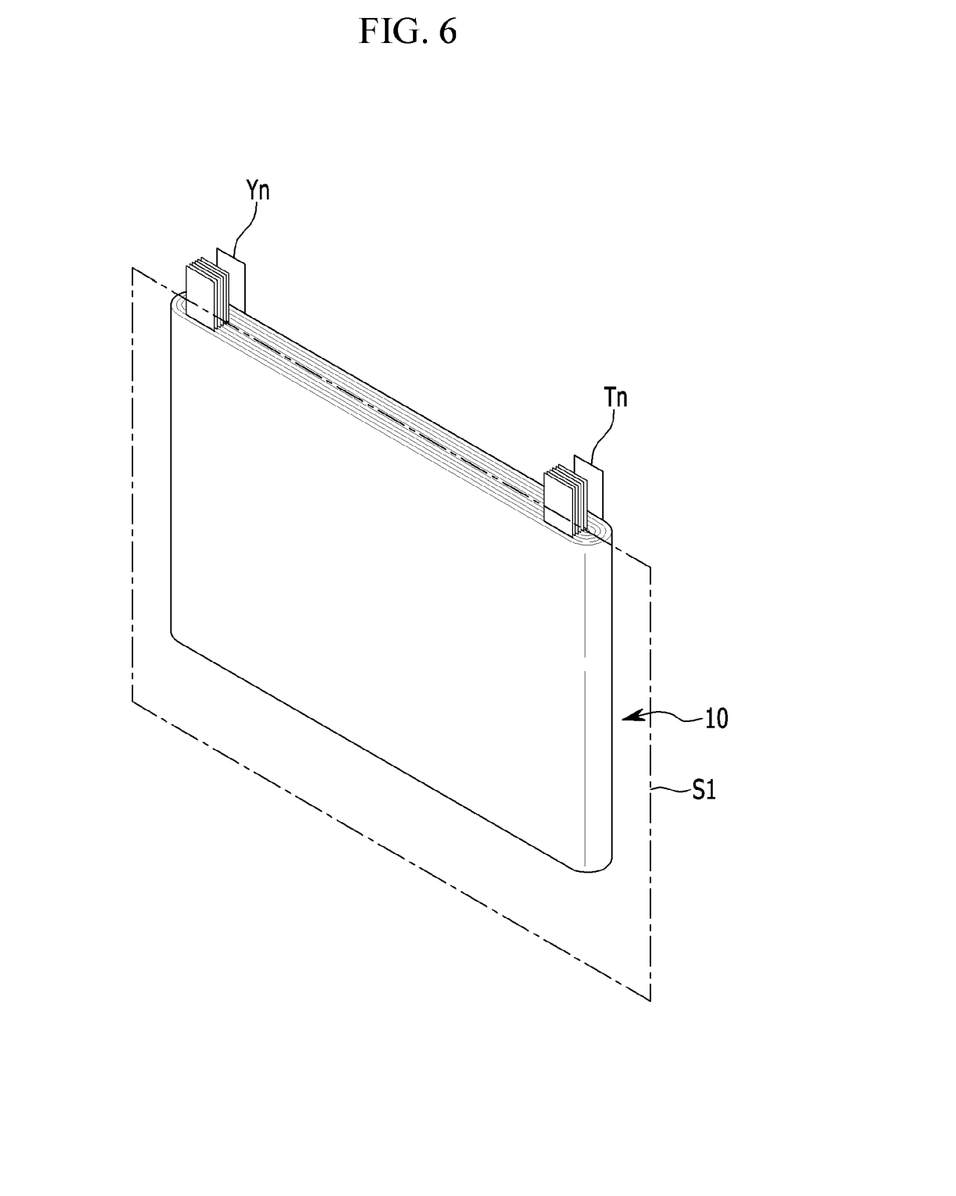
FIG. 6 is a perspective view showing an electrode assembly according to an embodiment.

In addition, as shown in FIG. 6, while the positive electrode 11 is wound, the first electrode tabs T1-Tn−1 face the first electrode tab Tn across an imaginary plane S1 passing a center of the electrode assembly 10. The imaginary plane S1 passes the center in a thickness direction of the electrode assembly 10, and is substantially parallel with stacked wide entire surfaces of the positive electrode 11. In addition, the first electrode tabs T1-Tn−1 face one surface of the imaginary plane S1, and the first electrode tab Tn faces the other surface of the imaginary plane S1, which is toward the opposite direction.

When the first electrode tab Tn placed at the outermost is positioned at the other side across the imaginary plane, the first electrode tabs can be stacked even though the distance between the first electrode tab Tn placed at the outermost side and the first electrode tab Tn−1 placed second from the outside is relatively small.

Figure 5:
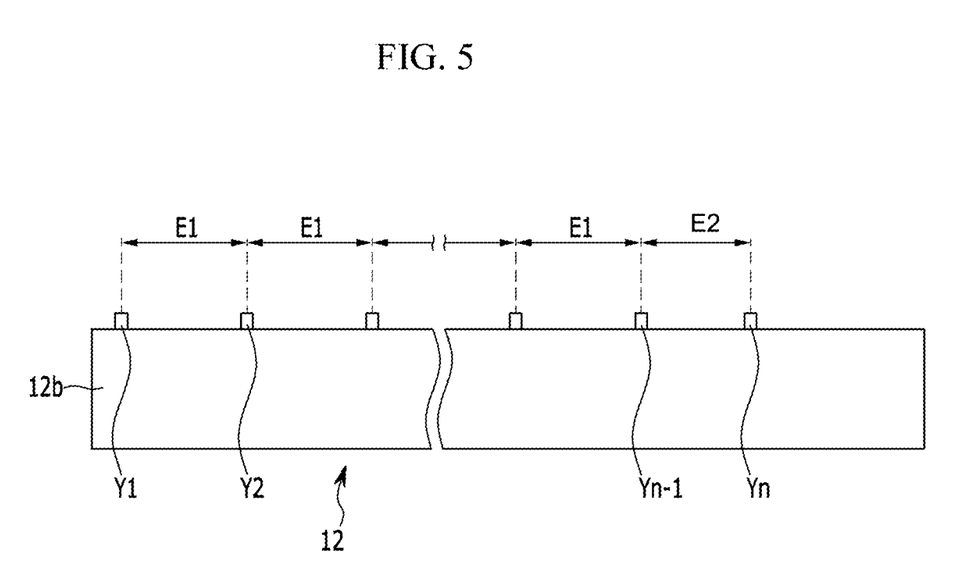
FIG. 5 is a developed plane view of a negative electrode according to an embodiment.

FIG. 5 is a developed plane view of a negative electrode according to an embodiment.

Referring to FIG. 5, the negative electrode 12 includes a plurality of second electrode tabs Y1-Yn that protrude upwardly from the second coated portion 12b. As shown in FIG. 5, the second electrode tab Y1 is placed at the innermost portion of the negative electrode 12 and the second electrode tab Y2 is placed at the second innermost portion of the negative electrode 12. Similarly, the second electrode tab Yn is placed at the outermost portion of the negative electrode 12, and the second electrode tab Yn−1 is placed at the second outermost portion of the negative electrode 12.

The second electrode tabs Y1-Yn are spaced apart from each other in a length direction of the negative electrode 12, and the distances E1 between the electrode tabs Y1-Yn of from the second electrode tab Y1 placed at the innermost side to the second electrode tab Yn−1 placed second from the outside in the electrode assembly 10 are the same.

In the present disclosure, the distances between the second electrode tabs Y1-Yn refer to spaced distances in a length direction of the negative electrode 12 on the basis of when the negative electrode 12 is spread in a plane form. In addition, the distance between the second electrode tabs Y1-Yn means a distance between centers of neighboring second electrode tabs Y1-Yn.

The distance E2 between the second electrode tab Yn and Yn−1 can be less than the distance E1 between two adjacent ones of the other second electrode tabs Y1-Yn−1 when the negative electrode 12 is spread in a plane form.

The distance E2 can be about 0.2 times to about 0.7 times the distance E1 However, depending on the embodiments, the distance E2 can be less than about 0.2 times or greater than 0.7 times the distance E1, as long as E2 is less than E1.

In addition, as shown in FIG. 6, while the negative electrode 12 is wound, the second electrode tabs Y1-Yn−1 face the second electrode tab Yn across an imaginary plane S1 passing a center of the electrode assembly 10. The imaginary plane S1 passes the center in a thickness direction of the electrode assembly 10, and is substantially parallel with stacked wide entire surfaces of the negative electrode 12. In addition, the second electrode tabs Y1-Yn−1 face one surface of the imaginary plane S1, and the second electrode tab Yn faces the other surface of the imaginary plane S1, which is toward the opposite direction.

As described above, when the second electrode tab Yn placed at the outermost side is positioned at the other side across the imaginary plane, the second electrode tabs can be stacked even though the distance between the second electrode tab Yn placed at the outermost side and the second electrode tab Yn−1 placed second from the outside is relatively small.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly for a rechargeable battery, comprising:
    a first electrode and a second electrode that are wound with a separator placed therebetween,
    wherein the first electrode includes a first coated portion coated with an active material and a plurality of first electrode tabs T1-Tn protruding outwardly from the first coated portion, wherein n is a natural number greater than 2,
    wherein the first electrode, when spread in a plane form, includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn−1 placed at a second outermost portion of the first electrode is less than any of the distances between two adjacent ones of the first electrode tabs T1-Tn−1, and wherein, when the first electrode is unwound, the first electrode tabs T1-Tn−1 face the first electrode tab Tn across an imaginary plane passing a center of the electrode assembly.

2. The electrode assembly of claim 1, wherein the distances between two adjacent ones of the first electrode tabs T1-Tn−1 are the same.

3. The electrode assembly of claim 2, wherein the distance between the first electrode tabs Tn and Tn−1 is about 0.2 times to about 0.7 times each of the distances between two adjacent ones of the first electrode tabs T1-Tn−1.

4. The electrode assembly of claim 1, wherein the second electrode includes a second coated portion coated with an active material and a plurality of second electrode tabs protruding outwardly from the second coated portion, and
    wherein the second electrode, when spread in a plane form, includes first to nth portions on which the second electrode tabs Y1-Yn are respectively formed, wherein the first and nth portions of the second electrode respectively define innermost and outermost portions thereof, wherein the distance between the second electrode tab Yn placed at the outermost portion and the second electrode Yn−1 placed at the second outermost portion of the second electrode is less than any of the distances between two adjacent ones of the second electrode tabs Y1-Yn−1.

5. The electrode assembly of claim 4, wherein the distances between two adjacent ones of the second electrode tabs Y1-Yn−1 are the same.

6. The electrode assembly of claim 4, wherein, when the second electrode is unwound, the second electrode tabs Y1-Yn−1 face the second electrode tab Yn across an imaginary plane passing a center of the electrode assembly.

7. The electrode assembly of claim 1, wherein the widths of all of the first electrode tabs are the same.

8. A rechargeable battery, comprising:
    an electrode assembly in which a first electrode and a second electrode are wound with a separator placed therebetween;
    a case containing the electrode assembly; and
    a cap plate connected to the case,
    wherein the first electrode includes a first coated portion coated with an active material and a plurality of first electrode tabs T1-Tn protruding outward of the first coated portion, wherein n is a natural number greater than 2, wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode Tn−1 placed at a second outermost portion of the first electrode is less than any of the distances between two adjacent ones of the other first electrode tabs T1-Tn−1 and wherein, when the first electrode is unwound, the first electrode tabs T1-Tn−1 face the first electrode tab Tn across an imaginary plane passing a center of the electrode assembly.

9. The rechargeable battery of claim 8, wherein the distances between two adjacent ones of the first electrode tabs T1-Tn−1 are the same.

10. The rechargeable battery of claim 9, wherein the distance between the first electrode tabs Tn and Tn−1 is about 0.2 times to about 0.7 times each of the distances between two adjacent ones of the first electrode tabs T1-Tn−1.

11. The rechargeable battery of claim 8, wherein the second electrode includes a second coated portion coated with an active material and a plurality of second electrode tabs protruding outwardly from the second coated portion, and
    wherein the second electrode, when spread in a plane form, includes first to nth portions on which the second electrode tabs Y1-Yn are respectively formed, wherein the first and nth portions of the second electrode respectively define innermost and outermost portions thereof, wherein the distance between the second electrode tab Yn placed at the outermost portion and the second electrode Yn−1 placed at the second outermost portion of the second electrode is less than any of the distances between two adjacent ones of the second electrode tabs Y1-Yn−1.

12. The rechargeable battery of claim 11, wherein the distances between two adjacent ones of the second electrode tabs Y1-Yn−1 are the same.

13. The rechargeable battery of claim 12, wherein, while the second electrode is unwound, the second electrode tabs Y1-Yn−1 face the second electrode tab Tn across an imaginary plane passing a center of the electrode assembly.

14. The rechargeable battery of claim 8, further comprising a first terminal electrically connected to the first electrode and formed on the cap plate, and a connection terminal formed in a pillar shape being fitted into the first terminal, and
    wherein the first terminal is electrically connected to the first electrode via a first current collecting member, the first current collecting member including an upper plate bonded to the connection terminal and an electrode attachment portion bent from the upper plate toward the electrode assembly to be bonded to the first electrode tabs.

15. The rechargeable battery of claim 8, wherein the rechargeable battery is configured to power a motor to start a vehicle.

16. An electrode assembly for a rechargeable battery, comprising:
    a first electrode and a second electrode;
    a separator placed between the first and second electrodes,
    a plurality of first electrode tabs T1-Tn protruding outwardly from the first electrode, wherein n is a natural number greater than 2, wherein the first electrode includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn−1 placed at a second outermost portion of the first electrode is less than any of the distances between two adjacent ones of the first electrode tabs T1-Tn−1, and wherein the first electrode tabs T1-Tn−1 face the first electrode tab Tn across an imaginary plane passing a center of the electrode assembly.

17. The electrode assembly of claim 16, wherein the distances between two adjacent ones of the first electrode tabs T1-Tn−1 are the same.

18. The electrode assembly of claim 16, wherein the distance between the first electrode tabs Tn and Tn−1 is about 0.2 times to about 0.7 times each of the distances between two adjacent ones of the first electrode tabs T1-Tn−1.

* * * * *